(No Model.) 2 Sheets—Sheet 1.

M. A. CLENNAM.
FIBER SEPARATING MACHINE.

No. 512,863. Patented Jan. 16, 1894.

Witnesses,

Inventor
Milton A. Clennam
By Dewey & Co.
Attys (No Model.) 2 Sheets—Sheet 2.

M. A. CLENNAM.
FIBER SEPARATING MACHINE.

No. 512,863. Patented Jan. 16, 1894.

Witnesses,
Inventor,
Milton A. Clennam
By Dewey & Co.
Attys

UNITED STATES PATENT OFFICE.

MILTON A. CLENNAM, OF SAN FRANCISCO, CALIFORNIA.

FIBER-SEPARATING MACHINE.

SPECIFICATION forming part of Letters Patent No. 512,863, dated January 16, 1894.

Application filed February 23, 1893. Serial No. 463,441. (No model.)

*To all whom it may concern:*

Be it known that I, MILTON A. CLENNAM, a citizen of the United States, residing in the city and county of San Francisco, State of California, have invented an Improvement in Fiber-Separating Machines; and I hereby declare the following to be a full, clear, and exact description of the same.

My invention relates to an apparatus for separating fiber and freeing it of the dust and cellulose material with which it is originally combined.

It consists of an apparatus and certain details of construction which will be more fully explained by reference to the accompanying drawings, in which—

Figure 1:
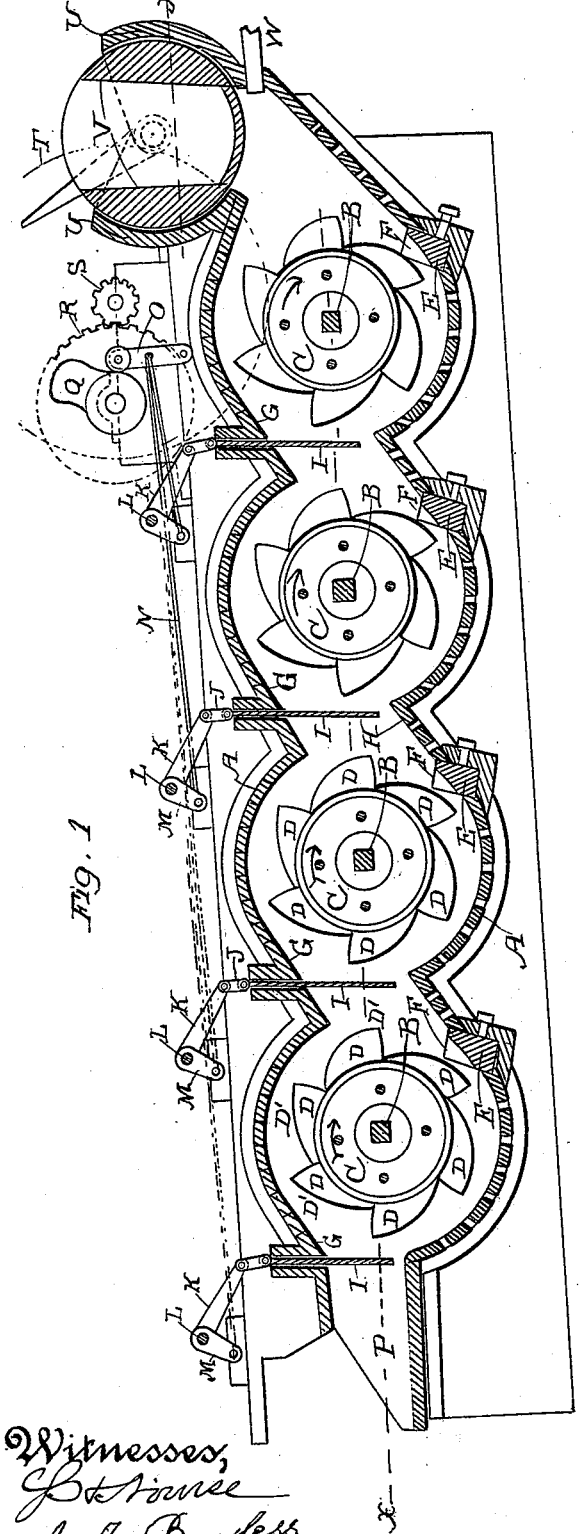
Figure 2:
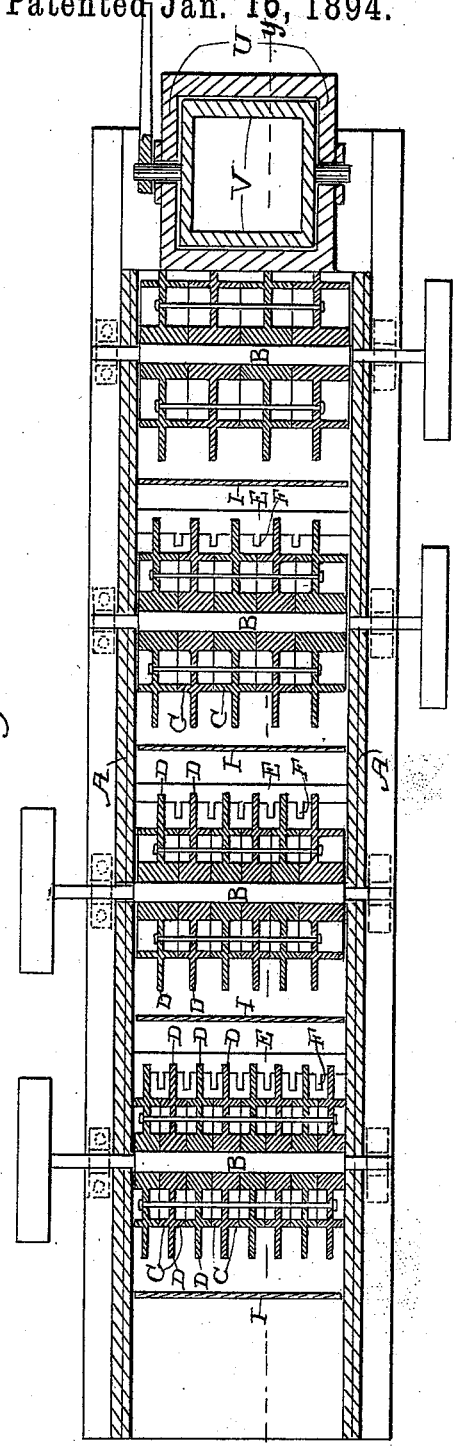
Figure 3:
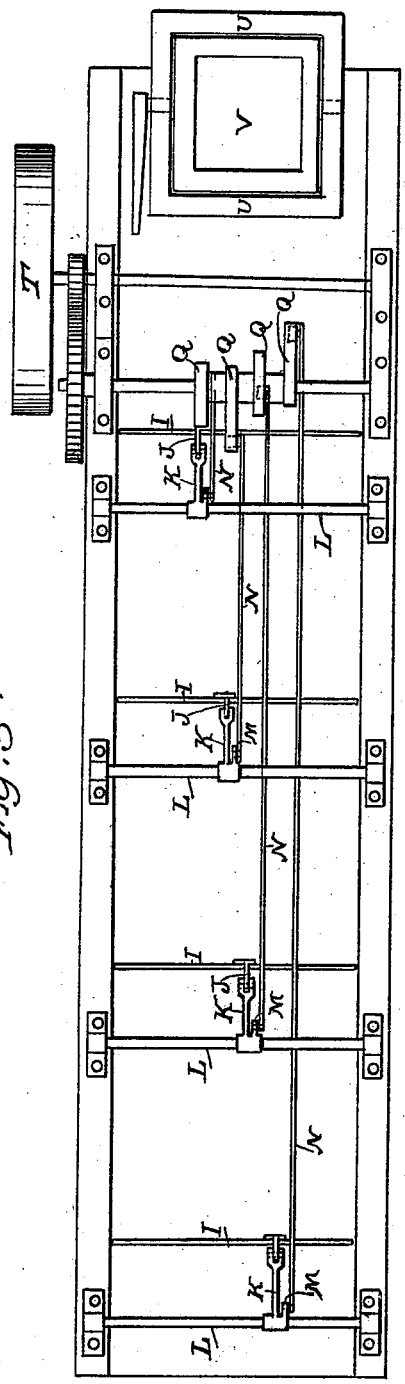

Figure 1 is a longitudinal vertical section on the dotted line $y$—$y$ of Fig. 2. Fig. 2 is a longitudinal horizontal section on the dotted line $x$—$x$ of Fig. 1. Fig. 3 is a top view of the device.

The object of my invention is to provide an apparatus by which fiber, and especially that of which the cocoa-nut husk is formed, may be separated from the intermediate cellulose substance which grows with it and by which it is intimately surrounded and inclosed.

My apparatus consists essentially of a series of independent rotating shafts having disks with teeth or projections upon their periphery and stationary bars with corresponding projecting plates between which the teeth pass, and means for delivering the material successively from one part of the apparatus to another, and for discharging the dust and cellulose.

A is a case which is closed at the sides, top and bottom and preferably inclined so that the discharge end is lower than the receiving end. Across this case extend the shafts B having mounted upon them disks C, formed with annular flanges faced so that the edges meet and fit closely, and these disks are formed with teeth D projecting from them around the periphery as shown. These disks are fitted upon the shafts so as to lie approximately close together with small spaces between the teeth of the adjacent plates. The spaces between the teeth nearest the feed opening are the widest, and they gradually decrease in size toward the discharge end.

E is a bar fixed across the lower part of the concave casing within which the disks and teeth revolve, and this bar has projections or teeth F corresponding in number with the teeth D upon the revolving disks. The teeth of the disks rotate within the concave sections A of the case, and the bars E are so fixed that their teeth or projections F extend into the case and between the teeth D of the disks, so that as the latter rotate any material which is placed in the case is taken between the teeth of the disks and the teeth or projections of the bars, and is thus subjected to a blow or concussion by which the fiber is separated from the cellulose.

The material which is treated in this apparatus is the outer husk of the cocoa-nut which is composed of a tough fiber, and an intermediate filling of cellulose which surrounds and inclosed the fiber and adheres to it with considerable force. This filling material is, however, quite brittle, and by passing the husks between the moving and stationary teeth, as before described, it will be broken out and stripped from the fiber by the concussion of the rapid blows, so that the latter will pass out freed from this substance. The cellulose thus separated is valuable for various purposes, notably for filling between the double walls of war vessels where it serves to close shot holes and prevent the entrance of water.

The bottom of the casing A is perforated with holes or slits of such size as to allow the cellulose to escape after it has been separated from the fiber, while the latter being of considerable length will be carried on out the discharge opening.

In order to free the fiber (which is often of considerable length) from the points of the revolving teeth, I curve the latter backward as shown at D′, so that when the fiber becomes folded around the teeth during the operation, it will easily slip off and not be dragged around to become broken and clog the machine.

In the present case I have shown a succession of the cylindrical cases A, and they unite with each other by chutes, the top and bottom of which are essentially tangent to the upper and lower curvatures of the case as shown at G and H respectively. The upper side of the chute G overlaps or extends beyond the corresponding lower side H of the chute, so that as the material is thrown by the rapid rotation of the teeth D, it will strike the surface G which will arrest its momentum and prevent it from flying to any greater distance. After being thus arrested by striking against the surface G, it drops by gravitation in an essentially vertical direction upon the surface H, and from there is swept into the second one of the cases A by the rotation of the disks and teeth in this case, and it is again subjected to the action of the teeth D and F in this case, passing again to the third case and so on to as many as may be desired, each one of which carries the operation a little farther until the fiber is eventually thoroughly clean, and the cellulose and dust have dropped out through the openings in the various cases and been disposed of. Through the chutes G pass the shutters or gates I which are connected by links J with the rocker-arms K mounted upon horizontal shafts L which extend across in the present case above the cases, and are oscillated in their journal-boxes by means of short crank arms M connected by rods N with cam actuated levers O. These levers are moved at intervals so that the sliding gates and shutters I are opened after a certain number of revolutions of the disk in either of the cases, so so that one shutter is opened and the material which has been acted on by the first set of revolving teeth will be delivered by centrifugal force into the second case while the shutter is open. The shutter then closes, and the same operation takes place in the second case, both the shutter at the entrance and at the delivery being temporarily closed. After a sufficient number of revolutions of the disk in this case, the shutter of the discharge opening is opened and the material passes into the third case.

The arrangement of the shutters I and their operative mechanism with relation to each other, is such that while the first shutter is opened, the second one will remain closed, and after the first one is closed, the second one will be opened for the transfer of material to the next operating drum, while the third one remains closed, and the second one is closed after the material has entered this drum, and so on to the end of the apparatus.

It will be understood that the shutters may be opened by moving in any direction most convenient by adapting the operating mechanisms for that purpose.

From the last drum the cleaning fiber is discharged through an opening P.

In order to move the lever O and operate the gates or shutters I in the proper succession, as shown in the present case, I employ a cam or cams Q mounted upon a shaft and adapted to engage the levers O and move them at the proper intervals. The shaft upon which the cam Q is mounted is driven by a gear-wheel R and a pinion S intermediate it and a driving gear T, or, if desired, belt pulleys may be employed for the purpose.

In order to feed the material into the first chamber A I have shown a hopper or casing U which is semi-cylindrical in form. Within this and mounted to rotate about the same center is a second semi-cylindrical casing V of sufficiently smaller diameter so that it rotates freely within the first casing or hopper, but without leaving enough space for material to pass between them.

In feeding the material into the machine, the hopper V is turned, with its open side uppermost, in which position it corresponds with the receiving opening of the casing U, and may be filled with the material. The lower part of the revolving casing V closes the discharge opening in the bottom of the casing U, and prevents any escape of dust through and between the two. When the casing V is revolved, it first closes the upper opening of the exterior casing U, and by continuing its motion the opening in the casing V is brought to register with the discharge opening in the casing U and the material then falls through into the first chamber A of the apparatus where it is received and acted on by the projecting teeth and the stationary blades or teeth as before described. To counteract the backward atmospheric pressure produced by the first cylinder, which tends to hold the lighter portion of the fiber in suspense against the apron at the rear, I employ a blast of air produced by any well known air forcing mechanism, and introduced to the rear of the machine through a slotted passage at W.

Having thus described my invention, what I claim as new, and desire to secure by Letters Patent, is—

1. In a fiber separating and cleaning machine a plurality of horizontal cylindrical chambers standing side by side and having a downward inclination from the first to the last, connecting passages with the upper and lower sides tangential alternately to the top of the first and bottom of the second connecting cylindrical chambers, rotary disks provided with teeth journaled in each of said chambers, movable gates or shutters adapted to open or close said passages and a pipe in the rear of the first chamber for the admission of a blast of air, substantially as herein described.

2. In a fiber separating and cleaning machine, a plurality of horizontal cylindrical chambers standing side by side and having a downward inclination from the first to the last, as shown, connecting passages with the upper and lower sides tangential alternately to the top of the first and bottom of the second connecting cylinders, and movable gates or shutters adapted to close or open said passages, substantially as herein described.

3. In a fiber separating and cleaning apparatus, a series of horizontal cylindrical chambers standing side by side and inclining downwardly from the first to the last, rotary disks with projecting teeth journaled in each of the cylinders and transverse stationary bars with projecting blades alternating with the teeth of the disks, a means for feeding the material into the first of the cylinders and preventing the escape of dust therefrom, connecting passages between the cylinders through which the material is delivered from one to another successively, gates whereby said passages are closed and opened, and connecting levers and cam mechanism whereby said gates are successively opened and closed at intervals, substantially as herein described.

4. A fiber separating and cleaning mechanism consisting of a series of cylinders arranged side by side serially and declining from first to last, a means for delivering the material to be treated into the first cylinder and preventing the escape of dust through said feed mechanism, connecting passages by which the material is delivered from each cylinder to the next, rotating toothed disks the shafts of which are journaled centrally within the cylinders and stationary projecting teeth so situated that the teeth of the disks pass between them while rotating, cut off gates by which the material is retained in either of the cylinders for a certain length of time before discharging, said gates being opened automatically to allow the material to pass successively from one cylinder to another, and openings made in the bottoms of the cylinders for the escape of the separated material, and a discharge opening at the end of the final cylinder for the delivery of the fiber, substantially as herein described.

5. In a fiber separating machine, a succession of horizontal cylinders side by side with connecting openings and controlling gates, fixed bars extending across each cylinder with inwardly projecting teeth, axially journaled disks revoluble within the cylinders and having teeth around their peripheries which are adapted to pass between the fixed teeth, said disk teeth having their front edges D' rounded and inclined rearwardly to free the fiber, substantially as herein described.

In witness whereof I have hereunto set my hand.

MILTON A. CLENNAM.

Witnesses:
S. H. NOURSE,
WM. F. BOOTH.